UNITED STATES PATENT OFFICE.

EDWARD HOWELL, OF ASHTABULA, OHIO.

PROCESS FOR REMOVING PHOTOGRAPHS FROM GLASS TO PAPER.

Specification forming part of Letters Patent No. 17,330, dated May 19, 1857.

*To all whom it may concern:*

Be it known that I, EDWARD HOWELL, of Ashtabula, county of Ashtabula, and State of Ohio, have made a new, useful, and valuable improvement in transferring the collodion-film from glass to paper or other substance in the ambrotype process of taking pictures; and I do hereby declare that the following is a full and exact description thereof.

The nature of my improvement consists in applying to the glass plate a coat of beeswax, upon which the collodion-film is flowed—as for ambrotype—instead of flowing the collodion direct upon the glass, as in the usual ambrotype process. The sensitizing-salts will not penetrate the coating of beeswax, whereby after the picture is perfected upon the glass plate the picture is transferred from the glass plate to paper or any other substance by means of attaching the glass plate to the paper by patent japan, blackened with ivory-black.

The following is the process adopted: I first thoroughly clean the glass plate, then warm it sufficiently to melt beeswax when placed upon it. I then proceed to wax the plate. Then, with a small strip of daguerrian cotton drawn tightly upon a block of wood of convenient size, level the warm wax on the glass plate to a thin and even coating. This should then be allowed to become cool. I then take the picture upon the waxed glass plate, prepared as above, in the usual manner of taking ambrotype pictures. I then dry the picture and color upon the collodion surface. I then flow the picture with patent japan, blackened with ivory-black. This I allow to become sufficiently dry as not to adhere to the fingers when pressed upon it. I then take a strip of black-surfaced paper corresponding in size with the glass plate, the paper having been previously saturated in water. I then cause the paper to perfectly adhere to every part of the coated picture by means of a roller covered with a soft substance. I then allow it to become dry. I then carefully remove the picture from the glass.

The advantages of my improvement are, first, in the safety from injury to the other materials used in the process; second, in the safety and ease of removing the picture from the glass plate without the use of water, spirits of wine, or any other substance; third, in the protection afforded to the surface of the picture by the beeswax without injuring the picture, but, on the contrary, tending to improve its tone; fourth, in the perfection of the picture immediately upon its removal from the glass plate without coloring or the removal of any extraneous substance therefrom, and its freedom from any veiled appearance; also, in dispensing with the use of any adhesive gums, thereby saving time and expense.

My mode of transferring differs from all other modes of transfer by the use of beeswax, other known modes being in the use of dissolved elastic gums or other substances requiring the assistance of water or spirits of wine to remove the picture from the glass plate, also requiring the removal of extraneous matter from the face of the picture; also, in procuring the adhesion of the paper or other substance to the coated glass plate by means of water, instead of any adhesive gums.

What I claim as my improvement, and desire to secure by Letters Patent, is—

The mode of transferring a positive impression from glass plate to paper or other desired substance by means of a coating of beeswax upon the glass plate, as herein described.

EDWD. HOWELL.

Witnesses:
MASON KING,
JAMES R. TYLER.